Jan. 12, 1943.   J. C. BLAKESLEE   2,308,047
PAINT AND VARNISH REMOVER
Filed Feb. 5, 1940
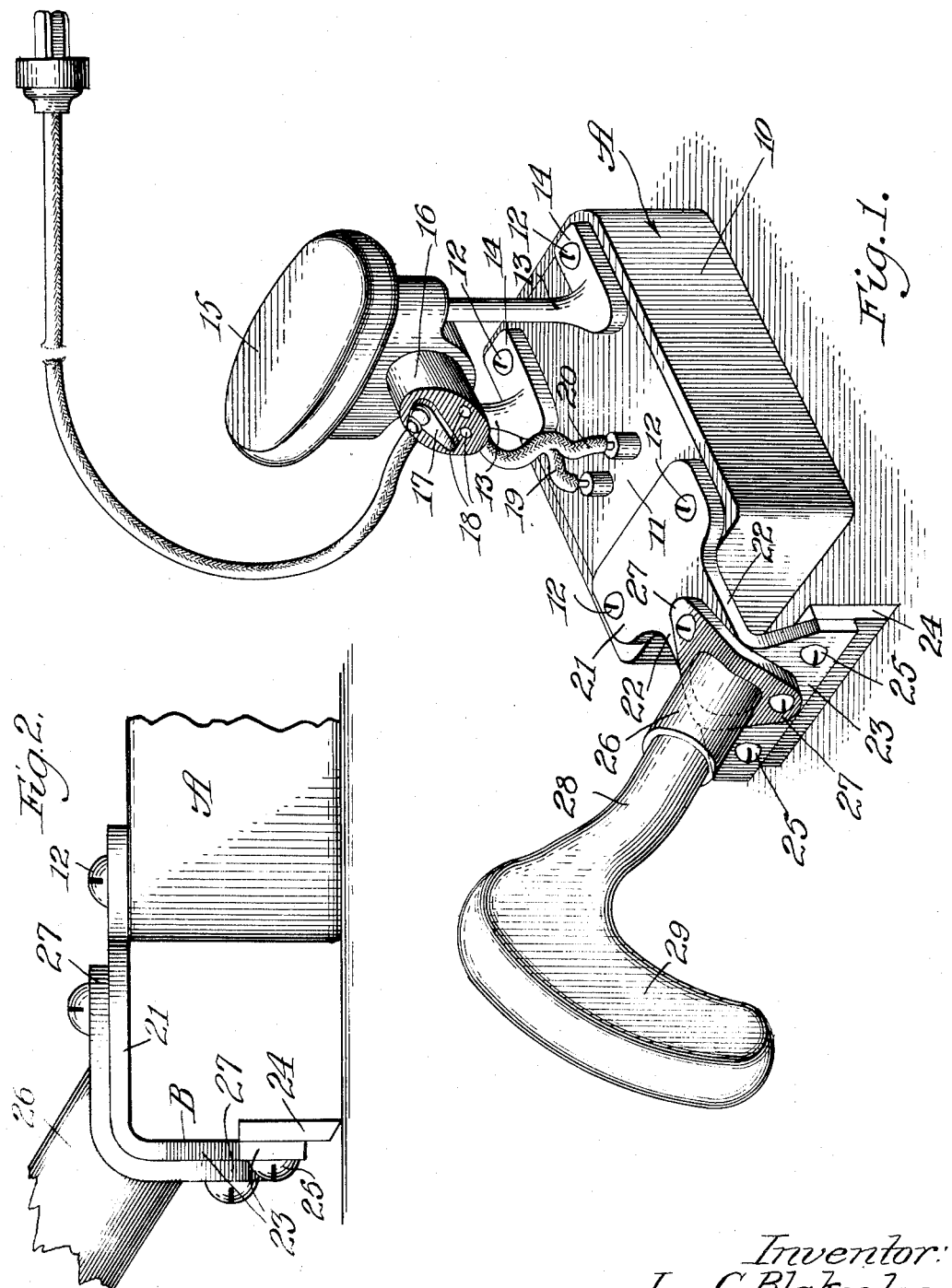
Inventor:
Jay C. Blakeslee,
By Dawson, Schmid & Booth,
Attys.

Patented Jan. 12, 1943

2,308,047

UNITED STATES PATENT OFFICE 2,308,047

PAINT AND VARNISH REMOVER

Jay C. Blakeslee, Chicago, Ill.

Application February 5, 1940, Serial No. 317,236

9 Claims. (Cl. 219—29)

This invention relates to a paint and varnish remover and more particularly to heat and scraper apparatus adapted to the removal of paint, varnish and other like materials.

It has heretofore been proposed that a heating element be passed over a paint or varnish surface followed by a scraper element. Such devices, however, have not proved successful due, in my view, to the failure to recognize additional important and essential features. The structures have either allowed the heating element of its own weight to rest upon the surface and without additional pressure, or else have required that the pressure be transmitted through a single handle supporting the heating element and the scraper. They have not provided means for differentially exerting pressure upon the heating element and upon the scraper element whereby the desired pressure for the heating element may be employed with respect to the particular type of paint or varnish being removed and at the same time the required pressure for the scraper element being applied through separate handle means to the scraper. Further, the devices have provided no means for supporting the heated element while cooling, with the element out of contact with the surface upon which the implement is supported.

An object of the present invention is to provide simple and effective apparatus whereby pressure may be exerted upon the heating element independently of the scraper and in sufficient amount to treat the specific paint or varnish layer being removed, while at the same time an appropriate amount of pressure may be exerted upon the scraper for removal of the loosened film or layer. A further object is to provide separate handle means for the heating element and the scraper element, whereby differential pressures may be exerted upon the two elements as needed, the two handles at the same time providing an insulating support for the heating element. A still further object is to provide a removable scraper means supported at a spaced distance from the variable heat pressure device employed. Other specific objects and advantages will appear as the specification proceeds.

In the specific embodiment of my invention, as illustrated in the drawing herein, Fig. 1 is a perspective view of my improved paint and varnish remover; and Fig. 2 is a fragmentary detail elevational view of the rear portion thereof, showing the heating element and scraper in engagement with a painted surface.

In the illustration given, A designates a heated pressure device; and B a scraper device.

The heated pressure shell A may be of any suitable construction. In the illustration given, the member A comprises a hollow metal shell 10 having a flat bottom wall providing an ironing surface. Within the shell 10 is a resistance plate for supplying the heat. A top plate 11 closes the shell and is secured thereto by screws 12 which enter threaded bosses (not shown) within the shell. In view of the well-known construction described, it is believed unnecessary to set forth further details.

Mounted upon plate 11 are two standards 13 each of which is provided with a bottom flange 14 perforated to receive screws 12. The standards 13 support a handle 15 formed of insulating material, such as, for example, Bakelite, wood, etc. Secured to the handle at the rear thereof is a variable heat control unit 16 of well known construction. The case of the unit pivotally supports a switch arm 17 adapted to engage one or more of contacts 18, the contacts leading to resistances by which the current flow into the resistance plate or element is varied. The current flows from the unit 16 through the wire 19 and returns through wire 20. The wires 20 pass through insulating collars to the resistance element.

It will be noted that the handle 15 provides a broad base upon which the pressure of the operator can be thrown, the broad base serving also as a means for supporting in conjunction with the scraper handle the heat pressure member 10 when it is inverted.

Connected to the rear of plate 11 is a scraper-supporting bracket 21, the horizontal portion of the bracket 21 having perforations receiving the screws 12. The bracket is narrowed as it extends rearwardly to provide a narrow neck 22. The bracket then is directed downwardly and widened to provide a vertical scraper-supporting flange 23. The removable scraper 24 is secured to the bracket 23 by screws 25 which extend through aligned threaded openings in the two members.

A handle socket 26 is provided with forked flanges 27, one of which is secured by a screw to the neck 22 and another of which is secured by a screw to the vertical flange 23. If desired, the parts may be secured together by welding.

Within the socket 26 extends the neck 28 of the handle 29, the neck and handle being formed preferably of an insulating material such as Bakelite, wood, hard rubber, etc.

With the structure shown, the scraper 24 is supported evenly behind the pressure iron 10. Ordinarily, a little play is provided by means of the screws 12 in engagement with the bracket 21 by which the scraper 24 can be depressed or raised with respect to the bottom surface of iron 10. For other operations, no play is required and the flange 21 can be secured tightly against the plate 11.

In treating a paint or other layer surface, it is found that when the heated iron becomes effective in loosening the paint, the paint layer expands and tends to lift the iron away from the surface. The swelling is uneven, being greater at one point than at another. It is therefore necessary, in order to obtain effective removal, to exert substantial pressure against the surface. If the member 10 is formed of relatively heavy metal, this aids in insuring pressure. In addition, the handle 15 enables the operator to maintain the desired pressure upon the iron.

With some paint or varnish layers, the film separates readily and very light pressure is required for the scraper. With other coatings, a very substantial pressure is needed for the scraper.

In the operation of the device, the heating element is set for the desired heat by swinging the lever 17 to the proper contact. For example, with some varnishes, temperatures of from 100° to 200° or 300° F. are found sufficient. For some paints, it is necessary to go from 200° F. to 1000° F. By means of the variable heat contact unit 16, it is possible to maintain the heat element to that desired so that effective heating can be brought about without so much danger of overheating the layer.

The two handles 29 and 15 are grasped by the operator and the desired pressure exerted upon each. As the iron 10 is moved forward, the scraper 24 engages the loosened film and the film peels up and around the narrow neck 22 and and is removed without clogging the device. The operation is continuous in one direction, the heating iron 10 loosening the layer and the scraper 24 removing it.

When a corner is reached or where it is necessary to use a hand tool in addition to the device described, the operator can swing the entire apparatus by means of the handle 29 so as to invert it, handle 29 and the wide flat handle 15 providing a sturdy support for the heated iron 10. The heating device may then be picked up readily and the removing operation resumed. Likewise, when it is desired to stop the operation, the element 24 can be cooled in inverted position so that it may be readily handled in tool boxes, etc.

In operating a device of this character, it is found that different surfaces of different contour and particularly moldings and trims require different types of scraper blades. With the apparatus shown, a scraper blade of the type needed by the particular varnish, lacquer or paint coating can be quickly inserted in position upon the supporting bracket and thus effectively employed.

The apparatus may be used not only for the removal of paint from the top of horizontal surfaces, but from the interior or exterior of vertical walls and from the top walls of rooms, halls, etc. The apparatus is extremely simple, compact and effective for the removal of paint, varnish and other layers, the desired amount of pressure being apportioned between the iron 10 and the scraper element 24.

While in the foregoing description, I have set forth certain details as being useful in the structure described, it will be understood that such details are set forth for the purpose of illustration and that the same may be varied widely without departing from the spirit of my invention.

I claim:

1. In apparatus for removing paint and varnish layers, a heating iron providing a flat heated surface, handle means secured to said iron for pressing said flat surface against a painted surface, said handle means being insulated from and disposed directly above said flat surface in spaced relation therewith, a scraper secured to the rear portion of said iron, and a handle for exerting pressure on said scraper.

2. In apparatus for removing paint and varnish, a pressure and heating iron providing a flat heated surface, a handle secured to said iron for pressing the flat surface of said iron against a painted surface, said handle being insulated from and disposed directly above said flat surface in spaced relation therewith, a bracket secured to the rear portion of said iron and provided with a vertically extending flange, a scraper blade of a width equal to said heating iron removably secured to said vertical flange of said bracket member, the edge of said scraper blade being in substantially the same plane as the flat surface of the iron, and an insulating handle secured to said bracket member for exerting pressure upon said scraper.

3. In apparatus of the character described for removing paint and varnish, a heating iron provided with a flat heated plate on the bottom thereof, a handle above said iron and secured thereto for pressing the heated plate against a painted surface to simultaneously heat the surface and exert pressure thereon, said handle being insulated from and disposed directly above said flat surface in spaced relation therewith, and a scraper secured to the rear portion of said iron, the lower edge of said scraper being in substantially the same plane as the lower surface of said plate whereby the edge of said scraper engages said painted surface when the heated plate is brought into contact therewith.

4. In apparatus of the character described for removing paint and varnish, a pressure-heating iron provided with a flat heated plate on the bottom thereof, a handle above said iron and secured thereto for pressing the heated plate against a painted surface to simultaneously heat the surface and exert pressure thereon, said handle being insulated from and disposed directly above said flat surface in spaced relation therewith, a bracket secured to the rear portion of said iron and provided with a vertically depending flange, a scraper plate of width equal to said heating iron removably secured to the lower portion of said flange, the lower edge of said scraper plate being in substantially the same plane as the lower surface of said heated plate whereby said plate and said scraper plate simultaneously engage said painted surface, and an insulating handle secured to said bracket for exerting pressure upon the scraper.

5. Apparatus as set forth in claim 1 in which the handles for the iron and for the scraper are so constructed and arranged as to provide a support for the apparatus when inverted, to maintain the heating iron away from the surface upon which the handles rest.

6. Apparatus as set forth in claim 1, wherein the scraper includes a bracket supported at the rear portion of the iron, and a blade removably secured to the bracket.

7. Apparatus as set forth in claim 1 wherein the handle for the heating iron and the handle for the scraper are provided with flat supporting surfaces on the upper surfaces thereof, said handles being arranged in spaced relation whereby the handles provide a base for supporting the iron in inverted position.

8. Apparatus as set forth in claim 1 wherein the heating iron is provided with an electrical resistance element and with variable means for controlling the heat generated by the resistance element.

9. In apparatus for removing paint and varnish layers, a heating iron providing a flat heated surface, handle means secured to said iron for pressing said flat surface against a painted surface, said handle means being disposed directly above said flat surface, a scraper secured to the rear portion of said iron, and a handle for exerting pressure on said scraper.

JAY C. BLAKESLEE.